United States Patent [19]

Irvin

[11] 4,278,506
[45] Jul. 14, 1981

[54] POLYMER SOLUTION PURIFICATION

[75] Inventor: Howard B. Irvin, Bartlesville, Okla.

[73] Assignee: Phillips Petroleum Company, Bartlesville, Okla.

[21] Appl. No.: 106,199

[22] Filed: Dec. 21, 1979

[51] Int. Cl.³ .......................... B01D 3/36; B01D 3/40
[52] U.S. Cl. ........................................ 203/68; 203/91; 525/366; 525/382; 526/340; 528/501
[58] Field of Search .................. 526/340; 528/501; 525/366, 382; 203/12, 14, 28, 38, 39, 49, 50, 51, 57, 59, 63, 62, 88, 91, 58

[56] References Cited

U.S. PATENT DOCUMENTS

| | | | |
|---|---|---|---|
| 2,368,497 | 1/1945 | Shipley et al. | 196/5 |
| 2,658,058 | 11/1953 | Werkema | 528/501 |
| 2,943,082 | 6/1960 | Cottle | 528/501 |
| 3,257,372 | 6/1966 | Moon | 260/93.7 |
| 3,259,555 | 7/1966 | Lankton et al. | 528/501 |
| 3,414,482 | 12/1968 | Folz | 203/2 |
| 3,462,347 | 8/1969 | Chapman et al. | 528/501 |
| 3,857,759 | 12/1974 | Fiore | 203/39 |
| 3,978,161 | 8/1976 | Nielsen et al. | 525/366 |

Primary Examiner—Frank Sever

[57] ABSTRACT

In preparing a solvent-polymer mixture for a subsequent reaction, e.g., metallation, wherein undesirable components lower boiling than the solvent, such as water, should be removed from the solvent and polymer, the undesirable components are removed by stripping using previously purified solvent, thereby preventing reboiler fouling. The stripping vapors are generated from solvent obtained from a source other than the fractionation column in which the stripping occurs in order to reduce costs. The process of this invention is particularly useful in removing water from a butadiene/styrene copolymer-cyclohexane solvent mixture prior to metallation of the copolymer.

7 Claims, 1 Drawing Figure

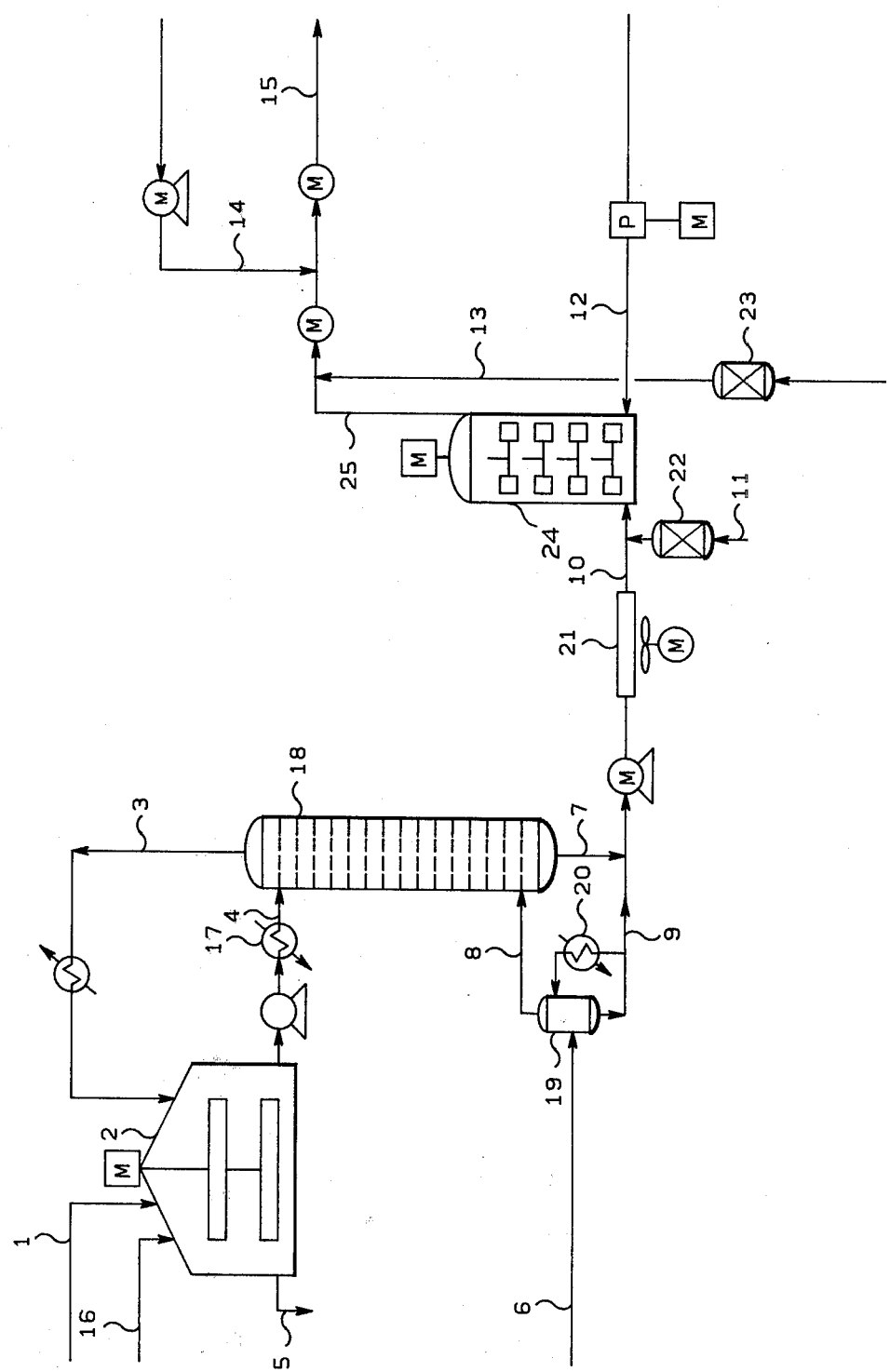

POLYMER SOLUTION PURIFICATION

BACKGROUND OF THE INVENTION

This invention relates to a method for removing undesirable components from polymer-solvent mixtures. In another aspect, this invention relates to a method of stripping undesirable components from a polymer-solvent mixture wherein vaporized solvent which is polymer free is used as the stripping vapor. In another aspect, this invention relates to removing undesirable components from polymer-solvent mixtures with dried solvent which has been obtained from a prior reaction and passing the purified polymer-solvent mixture to a subsequent reaction. In still another aspect, this invention relates to removing water from a conjugated diene-monovinyl arene copolymercyclohexane solvent mixture prior to metallation of the copolymer. In still another aspect, this invention relates to taking a hydrogenated butadiene/styrene copolymer in cyclohexane diluent obtained from a hydrogenation reaction, passing the mixture to a fractionation-stripping column where water is stripped from the copolymer solution by solvent vapors generated from cyclohexane which is free of polymer and then passing the recovered, dried polymer and solvent mixture to a metallation reactor for reaction with an alkyllithium, such as n-butyllithium. In still another aspect, this invention relates to a method for removing water and other components boiling at lower temperatures then the solvent from a polymer-solvent mixture employing dried solvent obtained from existing storage as the shipping medium to remove water and said other components and yield a substantially pure and dried polymer-solvent product as bottoms.

The removal of undesirable components from a polymer-solvent mixture is many times necessary prior to subsequent reaction of the polymer. The important qualities of the solvent for reaction are: (1) freedom from hydrogen donor impurities, (2) freedom from polar compounds, (3) solubility of polymers in solvent, also viscosities of polymer solutions, (4) good volatility for removal from polymer, (5) commercial availability at reasonable price, (6) low environmental problems, (7) effects on polymer structure during reaction, especially polymer solution, e.g., cis, trans, vinyl configurations, (8) low freezing point for process operations. When metalizing a hydrogenated butadiene/styrene copolymer with alkyllithium, for example, it is necessary to carry out the reaction in a very dry solution (less than 5 ppm water) since the alkyl lithium is destroyed by water. It is required, therefore, that a wet hydrogenated butadiene/styrene copolymer-solvent mixture be dried before metallation of the copolymer with butyllithium.

In a process such as the metallation of a butadiene/styrene copolymer, both the copolymer and solvent must be substantially free of water. Separation of the polymer and solvent would allow one to dry the solvent in a fractionation column and use separated solvent from the column as stripping vapors, however, a separation of the solvent and copolymer would further require drying the polymer. Two drying steps, as well as an additional separation step, would, therefore, be required as opposed to the invention method in which the polymer and solvent mixture is not separated and both the solvent and polymer are dried in a single step.

In the drying of polymer solutions, stripping vapors are frequently generated by reboiling part of the polymer-solvent product bottoms obtained from the stripping column which results in reboiler fouling. Since a polymer solution rapidly fouls heat transfer surfaces if boiling occurs in the reboiler, one method of preventing the fouling would be to employ a high flow-rate, high-pressure pump-around system with flask letdown to prevent the solution containing the polymer particles from boiling and thereby depositing the polymer particles on the reboiler to cause reboiler fouling. It would be preferred, however, if a low pressure heat transfer system could be used without causing reboiler fouling problems due to the economic savings of a low pressure heat transfer system. Also the heat transfer rates are much better for solvent compared to polymer solutions. This results in much smaller heat exchangers for the reboilers handling solvent only.

Accordingly, it is an object of this invention to provide a process wherein both the polymer and solvent of a polymer-solvent mixture taken from a prior reaction can be dried at the same time, recovered as a single product and passed to a subsequent reaction without the problem of reboiler fouling.

Another object of this invention is to provide a method for removing water from a polymer-solvent mixture without the use of a high flow-rate, high-pressure pump for generating stripping vapors.

Still another object of this invention is to provide an economical and time saving process for securing the absence of water in a polymer-solvent mixture which is passed to a metallation reaction.

Another object of this invention is to provide a process wherein water is removed from both a polymer and a solvent without the need for prior separation of the solvent and polymer.

Other aspects, objects and the several advantages of the invention will become apparent to one skilled in the art upon studying the drawing, specification and appended claims.

SUMMARY OF THE INVENTION

The present invention comprises passing a polymer-solvent mixture containing undesirable components to a fractionation-stripping zone wherein undesirable components lower boiling than the solvent are separated and a purified polymer-solvent mixture is recovered by contacting the polymer-solvent mixture in said zone with dry solvent from another drying operation under conditions which provide the stripping vapors and thereby minimize fouling of the heat transfer surfaces. In order to prevent reboiler fouling and yet remove the undesirable components from both the polymer and solvent in the same step, solvent which is free of said polymer is vaporized and added to the bottom portion of the fractionation column to act as a stripping agent for the undesirable components. The added stripping component is generally taken from a source other than the fractionation column, e.g., existing storage for dry solvent. The polymer-solvent mixture recovered as the fractionation column bottoms is then passed to a subsequent reaction.

In a specific embodiment of this invention, hydrogenated butadiene/styrene copolymer in a cyclohexane solvent is passed to a fractionation-stripping column to strip water and other components boiling at lower temperatures than the solvent from the polymer and solvent. Dry cyclohexane, taken from existing storage, is vaporized and added to the bottom portion of the fractionation column to act as a stripping vapor for water and other lower boiling materials. The polymer and solvent are recovered as the bottom product from the fractionation column and passed to a metallation reactor for reaction with n-butyllithium.

BRIEF DESCRIPTION OF THE DRAWINGS

The FIGURE shows a schematic diagram of a specific embodiment of this invention. Hydrogenated butadiene/styrene copolymer is prepared for metallation with alkyllithium by removing all of the water from the copolymer and solvent in the single stripping step employing dry cyclohexane vapor generated from cyclohexane solvent taken from existing storage.

DETAILED DESCRIPTION OF THE INVENTION

The process of the claimed invention is particularly applicable to the metallation of hydrogenated conjugated dienemonovinyl arene copolymers with alkyllithium. A requirement of the reaction is that substantially no water and other lower boiling contaminants be present because alkyllithium is easily destroyed by these impurities. The solvent and the polymer, therefore, must be thoroughly dried prior to reaction with the alkyllithium. The process of the present invention allows one to take hydrogenated polymer in reaction solvent and dry both the polymer and solvent without a separation operation such as flashing to first separate the polymer from the reaction solvent. Generally, there would be a problem with reboiler fouling in drying a copolymer-solvent mixture because of the presence of polymer in the reboiler. Any liquid stream taken from the fractionation column and reboiled to create stripping vapors would contain polymer particles which would cause reboiler fouling.

The present invention allows one to dry the polymer and solvent together in a single step using a fractionation tower yet avoids the problem of reboiler fouling without using a costly high-head pump-around system with flash letdown by obtaining the stripping vapors from vaporized, substantially dry solvent which is free of said polymer and obtained from an existing source. This allows recovery of the polymer and solvent as the bottom of the fractionation column with immediate passage of the recovered mixture to the metallation reactor.

Any solvent mixing well with the polymer solution and having a lower volatility than the material being stripped can be used as a stripping agent. However, the solvent selected should be the same as the solvent used in the solution to the top of the stripping column; otherwise in a commercial plant with solvent recycle an additional solvent separations column would be necessary. The applicable solvents include cyclopentane, methylcyclopentane, cyclohexane, n-hexane, n-heptane, benzene, toluene, or any branched $C_5$–$C_8$ paraffins which have lower volatility than water in the polymer solution and are effective as diluent in the reactions of polymerization, hydrogenation, and metallation.

The use of dry solvent obtained from a source other than the fractionation column, e.g., existing storage or some other source where absence of polymer and water and other contaminants can be insured provides advantages for the present invention over other systems. Some of the advantages included are higher heat transfer coefficients because of lower liquid viscosity and less surface fouling, and use of a low pressure heat transfer system such as a thermosiphon reboiler and a knockout tank instead of a high-head, pump-around system with flash letdown.

A better understanding of the invention will be obtained upon reference to the drawing. The process of the present invention will be explained in terms of a preferred embodiment, metallizing a hydrogenated copolymer with alkyllithium. The following embodiments are not intended to limit the invention in any way and are only given for illustration.

Referring to the FIGURE, wet polymer solution (1), e.g., obtained from a conventional hydrogenation reaction wherein the hydrogenated polymer solution is treated with aqueous diammonium phosphate and filtered to remove catalyst, preferably is introduced into blend tank (2). Alternatively, the wet polymer and solution mixture can be added directly to fractionation column (18). The wet polymer-solvent mixture can be the hydrogenated copolymer still dissolved in the diluent employed in the hydrogenation step, after removal of the insoluble catalyst by filtration.

The preferred polymer employed is a conjugated dienemonovinylarene copolymer. Suitable conjugated diene monomers for making the copolymers can be exemplified by those aliphatic hydrocarbon dienes from 4 to 8 carbon atoms per molecule. Examples include butadiene, isoprene, 2,3-dimethylbutadiene, piperylene, and the like. Suitable monovinylarene monomers for making the copolymer can be exemplified by those hydrocarbon monovinylarenes of 8 to 15 carbon atoms per molecule. Exemplary monovinylarenes include styrene, 3-methylstyrene, 3,5-diethylstyrene, 4-tolystyrene, and the like. The preferred copolymer is that of butadiene/styrene and the remainder of the drawing will be explained in terms of butadiene/styrene copolymer.

Examples of suitable diluents that can be used are any of the paraffinic or cycloparaffinic hydrocarbons known in the art, used alone or in admixture, typically of 4 to 10 carbon atoms per molecule. Exemplary species include benzene, toluene, n-heptane, cyclohexane, and n-hexane. Cyclohexane is preferred for reasons of handling, high solubility of polymer, and availability. The remainder of the drawing will be explained in terms of using cyclohexane as the solvent.

If the wet polymer-solvent mixture is added to a blend tank, the solution can be allowed to remain in the tank for a period of time sufficient to allow free water to settle out. The free water can be taken off the bottom of the tank by conduit (5). Wet cyclohexane diluent (16) from plant storage and/or overhead condensate (3) from fractionation column (18) can also be added to tank (2).

The solvent-polymer mixture is removed from tank (2) and transported via conduit (4) and heat exchange means (17) to fractionation column (18). The solvent-polymer mixture will generally contain at least 5% by weight of polymer. It is preferred that the mixture be added to the upper portion of fractionation column (18). The water is stripped from the polymer-solvent mixture and in fractionation column (18). The fractionation column can be any column such as those stripping towers used generally for drying solvents in solution polymerization plants using alkyl lithium or other water sensitive catalysts. The fractionation column is generally a multistage distillation column, preferably about 20 stages.

In order to strip the water from the polymer and solvent, stripping vapor must be generated. Generally this is done by taking a bottoms stream from the fractionation column, reboiling the stream and feeding it into the bottom portion of the fractionation column. Due to the presence of the polymer as well as the solvent in the fractionation, the feedstream to the fractionator containing at least 5% polymer by weight, reboiler fouling would become a problem if bottoms stream or a side stream from the fractionation column was used. This fouling could be overcome by using high-cost, high-flow-rate, high-pressure pump and flash letdown system but this would be economically undesirable. These problems are obviated, however, by taking dry cyclohexane (6) from existing storage, thereby insuring that the cyclohexane is essentially free of polymer, e.g., less than 5 ppm of polymer, vaporizing it in heat exchanger (20) and introducing it via (8) into the bottom portion of the fractionation column (18). The amount of cyclohexane added for use as stripping vapors can vary greatly and the optimum amount can easily be determined by one skilled in the art for the particular stripping process.

The dried polymer-solvent mixture is recovered as bottoms (7) and passed through conduit (10) to a subsequent reaction, i.e., metallation reactor (24). It is important that the dried polymer-solvent mixture (7) is essentially free of water, for example less than 5-10 ppm of water, otherwise the metallation reaction would be adversely affected through destruction of the alkyl lithium by water. Along with the mixture, dry cyclohexane (9) can also be passed to the metallation reactor. The dry cyclohexane is heated in heat exchanger (20) and returned to knock-out tank (19). The polymer-solvent mixture can also be cooled (21) prior to introduction to metallation reactor (24).

The hydrogenated butadiene/styrene copolymer is metallated in reactor (24) using an organolithium compound in conjunction with a polar compound in order to introduce lithium atoms along the hydrogenated copolymer structure. The metallation is carried out by means of a complex formed by the combination of the lithium component with a polar metallation promoter. The polar compound and the lithium component can be added separately or can be premixed or prereacted to form an adduct prior to addition to the solution of the hydrogenated copolymer. The lithium component can be represented by $R'(Li)_x$ wherein $R'$ is generally a saturated hydrocarbon radical of any length whatsoever, but ordinarily containing up to 20 carbon atoms. $R'$ can also be an aromatic radical, a saturated cyclic hydrocarbon radical, a monounsaturated cyclic hydrocarbon radical, an unconjugated, unsaturated aliphatic hydrocarbon radical, an alkyl lithium having one or more aromatic groups on the alkyl group, with x being an integer of 1 to 3. The polar compound promoters can be selected from a variety of tertiary amines, bridgehead amines, ethers, and metal alkoxides as are well known in the art. The preferred lithium component is n-butyllithium (NBL) and the preferred polar compound promoter is tetramethylethylenediamine.

In the drawing, the lithium component and polar compound promoter are added separately to the metallation reactor. The lithium component, n-butyllithium, is added via (12) as a 15 weight percent solution of n-butyllithium in cyclohexane. The tetramethylethylenediamine (TMEDA) is added via (11) and is dried in drying means (22) to insure that no water is present. The drying means can be any appropriate drying means such as an alumina dessicant bed.

Once the metallation reaction is complete, the product is removed from the reactor via (25). The reactor effluent is mixed in line with a suitable nitrogen-containing organic compound in order to provide dispersant as well as viscosity index improving properties to the final product. An example of a suitable nitrogen-containing organic compound is 4-dimethylamino-3-methyl-2-butanol (DMAMB). 4-Dimethylaminobenzaldehyde is now preferred. The 4-dimethylamino-3-methyl-2-butanol is dried in suitable drying means (23) and passed via (13) to line (25) where it is mixed with the reactor effluent. The mixing can take place by conventional means such as a two-stage tandem-shear pipeline mixer as is commercially available.

Quenching of the product by addition of an appropriate reagent such as methanol to displace lithium with hydrogen can take place by adding the methanol via (14) and mixing in line in a second two-stage tandem-shear pipeline mixer or some other conventional mixing means. The final product is removed via (15).

The operating temperature for column 18 can range from about 115° to about 290° F. in the upper portion and from about 120° to about 300° F. in the lower portion. The operating pressure can vary from about 15 to about 80 psia in both the upper and lower portions of the column.

The following illustrates typical operating conditions when using cyclohexane as the solvent in preparing a polymer-solvent mixture for metallation reaction.

TABLE I

| | TYPICAL OPERATING CONDITIONS | | |
|---|---|---|---|
| Item | | Temp | Pressure |
| 1 | Wet solution | 130° F. | 20 PSIA |
| 6 | Dry solvent | 90° F. | 20 PSIA |
| 8 | Stripping vapor | 223° F. | 30 PSIA |
| 10 | Solution leaving | 176° F. | |
| 11 | TMEDA for metallation | 70° F. | |
| 12 | NBL solution | 70° F. | |
| 13 | DMAMB for metallation product mixture | 70° F. | |
| 16 | Wet solvent | 90° F. | 20 PSIA |
| 17 | Heat exchanger | 3 MM BTU/hr. | |
| 18 | Stripping tower | | |
| | Upper Section | 190° F. | 18 PSIA |
| | Lower Section | 197° F. | 20 PSIA |
| 20 | Heater | 1.5 MM BTU/hr. | |
| 22 | Adsorber dryer | 0.26 lb H$_2$O/hr. max | |
| 23 | Adsorber dryer | 1.7 lb H$_2$O/hr. max | |
| 24 | Metallation reactor | 176° F. | 45 PSIA |

TMEDA = tetramethylethylenediamine
NBL = n-butyllithium
DMAMB = 4-diemthylamino-3-methyl-2-butanol The following table provides a material balance for a typical operation as shown in the FIGURE. The embodiments are not intended to limit the invention in any way and are only given for illustration.

TABLE II

| Stream No. | 1 | 16 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | MATERIAL BALANCE (in pounds per hour) | | | | | | | | | | | | | | |
| Cyclohexane | 24,762 | 5,203 | 10,280 | 40,245 | | 7,035 | 36,500 | 6,535 | 500 | 37,000 | | 164 | | | 37,164 |
| Polymer | 3,700 | | | 3,700 | | | 3,700 | | | 3,700 | | | | | |

TABLE II-continued

| Stream No. | 1 | 16 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| MATERIAL BALANCE (in pounds per hour) | | | | | | | | | | | | | | | |
| Water | 57 | 1 | 9 | 9 | 58 | | | | | | | | | | |
| TMEDA | | | | | | | | | | | | 52 | | | 52 |
| NBL | | | | | | | | | | | | | 29 | | |
| DMAMB | | | | | | | | | | | | | | 57 | |
| Methanol | | | | | | | | | | | | | | 14 | |
| Butane | | | | | | | | | | | | | | | 26 |
| Lithium Methylate | | | | | | | | | | | | | | | 17 |
| Final Product | | | | | | | | | | | | | | | 3,757 |
| Total | 28,519 | 5,204 | 10,289 | 43,954 | 58 | 7,035 | 40,200 | 6,535 | 500 | 40,700 | 52 | 193 | 57 | 14 | 41,016 |

Reasonable variations and modifications are possible within the scope of the foregoing disclosure and the appended claims to the invention.

I claim:

1. A process for purifying a polymer-solvent mixture which contains undesirable volatile components including water lower boiling than the solvent for further reaction comprising the steps of passing a polymer-solvent mixture which contains undesirable volatile components including water lower boiling than the solvent to an upper portion of a fractionation-stripping zone and allowing said polymer-solvent mixture to flow downwardly through said zone with separation of the undesirable components as overhead and recovery of the polymer-solvent mixture as bottoms, adding vaporized, purified dry solvent obtained from another drying operation and which is the same as the solvent used in said mixture and which is free of said polymer to the kettle portion of the fractionation column to act as a stripping vapor for the undesirable volatile components including water, whereby the problem of reboiler fouling due to the presence of polymer in the stripping solvent is substantially avoided, and passing said polymer-solvent mixture substantially freed of water and other undesirable components recovered as bottoms to said further reaction.

2. The process of claim 1 wherein the solvent added to the bottom portion of the fractionation column is taken from existing storage of purified solvent.

3. The process of claim 1 or 2 wherein said polymer is a conjugated diene-monovinyl arene copolymer.

4. The process of claim 3 wherein the solvent is cyclohexane.

5. The process of claim 3 wherein the polymer is butadiene/styrene and said solvent is cyclohexane, the polymer-solvent mixture passed to said fractionation-stripping zone is obtained from a hydrogenation reaction, and the recovered polymer-solvent mixture is passed to a metallation reaction.

6. The process of claim 5 wherein said recovered polymer-solvent mixture is contacted with tetramethylethylenediamine and a solution of n-butyllithium in cyclohexane and the metallated polymer in solvent is then contacted with 4-dimethylamino-3-methyl-2-butanol or 4-dimethylaminobenzaldehyde.

7. The process of claim 6 wherein methanol is added to the metallated polymer in solvent.

* * * * *